US009535894B2

(12) United States Patent
Carrier et al.

(10) Patent No.: US 9,535,894 B2
(45) Date of Patent: Jan. 3, 2017

(54) AUTOMATED CORRECTION OF NATURAL LANGUAGE PROCESSING SYSTEMS

(71) Applicant: International Business Machines Corporation, Armonk, NY (US)

(72) Inventors: Scott R. Carrier, Apex, NC (US); Joy Mustafi, Kolkata (IN); Anil M. Omanwar, Pune (IN); Avinesh Polisetty Venkata Sai, Kakinada (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/696,677

(22) Filed: Apr. 27, 2015

(65) Prior Publication Data

US 2016/0314106 A1 Oct. 27, 2016

(51) Int. Cl.
G06F 17/24 (2006.01)
G06F 17/28 (2006.01)
G06F 17/27 (2006.01)
G06F 17/25 (2006.01)

(52) U.S. Cl.
CPC .......... G06F 17/241 (2013.01); G06F 17/25 (2013.01); G06F 17/2735 (2013.01); G06F 17/28 (2013.01)

(58) Field of Classification Search
CPC .... G06F 17/241; G06F 17/2735; G06F 17/25; G06F 17/28
See application file for complete search history.

(56) References Cited

U.S. PATENT DOCUMENTS

| 8,131,756 | B2 | 3/2012 | Carus et al. |
| 8,725,666 | B2 | 5/2014 | Lemmond et al. |
| 8,831,947 | B2 | 9/2014 | Wasserblat et al. |
| 2007/0299664 | A1 | 12/2007 | Peters et al. |
| 2009/0119095 | A1 | 5/2009 | Beggelman et al. |

(Continued)

FOREIGN PATENT DOCUMENTS

JP 09212511 A 8/1997

OTHER PUBLICATIONS

Collobert, R., et al. "Natural Language Processing (almost) from Scratch." The Journal of Machine Learning Research12 (2011): 2493-2537.

(Continued)

Primary Examiner — Qian Yang
(74) Attorney, Agent, or Firm — William H. Hartwell

(57) ABSTRACT

Machine logic that automatically detects natural language processing (NLP) system annotation errors and correspondingly updates NLP annotators to prevent future erroneous annotations by performing the following steps: (i) determining that a first annotation error has occurred in an annotation of a corpus by the natural language processing system; (ii) generating a candidate set of annotation correction actions, where each annotation correction action of the set is adapted to prevent an occurrence of an error similar to the first annotation error by the natural language processing system; (iii) selecting an annotation correction action from the candidate set of annotation correction actions, based, at least in part, on a set of annotation correction confidence characteristics; and (iv) automatically applying the selected annotation correction action to the natural language processing system.

15 Claims, 3 Drawing Sheets

(56) References Cited

U.S. PATENT DOCUMENTS

| | | |
|---|---|---|
| 2010/0082333 A1* | 4/2010 | Al-Shammari ..... G06F 17/2735 704/10 |
| 2012/0089629 A1 | 4/2012 | Koll et al. |
| 2014/0019116 A1 | 1/2014 | Lundberg et al. |
| 2014/0181128 A1 | 6/2014 | Riskin et al. |
| 2014/0330586 A1 | 11/2014 | Riskin et al. |

OTHER PUBLICATIONS

Resnik, P. "Semantic Similarity in a Taxonomy: An Information-Based Measure and its Application to Problems of Ambiguity in Natural Language." Journal of Artificial Intelligence Research 11 (1999) pp. 95-130. AI Access Foundation and Morgan Kaufmann Publishers.

* cited by examiner

AUTOMATED CORRECTION OF NATURAL LANGUAGE PROCESSING SYSTEMS

BACKGROUND

The present invention relates generally to the field of natural language processing, and more particularly to correcting components of natural language processing systems.

Natural language processing (NLP) is a field of computer science, artificial intelligence, and linguistics concerned with the interactions between computers and human (natural) languages. Generally speaking, NLP systems use machine learning to analyze and derive meaning from textual corpora (that is, sets of textual content). Many known NLP systems annotate textual corpora (also referred to simply as "corpora," or, in the singular, a "corpus") with information that may be helpful in understanding and/or interpreting the text. For a Definition of "annotate," see the Definitions sub-section of the Detailed Description section.

SUMMARY

According to an aspect of the present invention, there is a method, computer program product and/or system that performs the following steps (not necessarily in the following order): (i) determining that a first annotation error has occurred in an annotation of a corpus by a natural language processing system; (ii) generating a candidate set of annotation correction actions, where each annotation correction action of the set is adapted to prevent an occurrence of an error similar to the first annotation error by the natural language processing system; (iii) selecting an annotation correction action from the candidate set of annotation correction actions, based, at least in part, on a set of annotation correction confidence characteristics; and (iv) automatically applying the selected annotation correction action to the natural language processing system.

DETAILED DESCRIPTION

Figure 1:
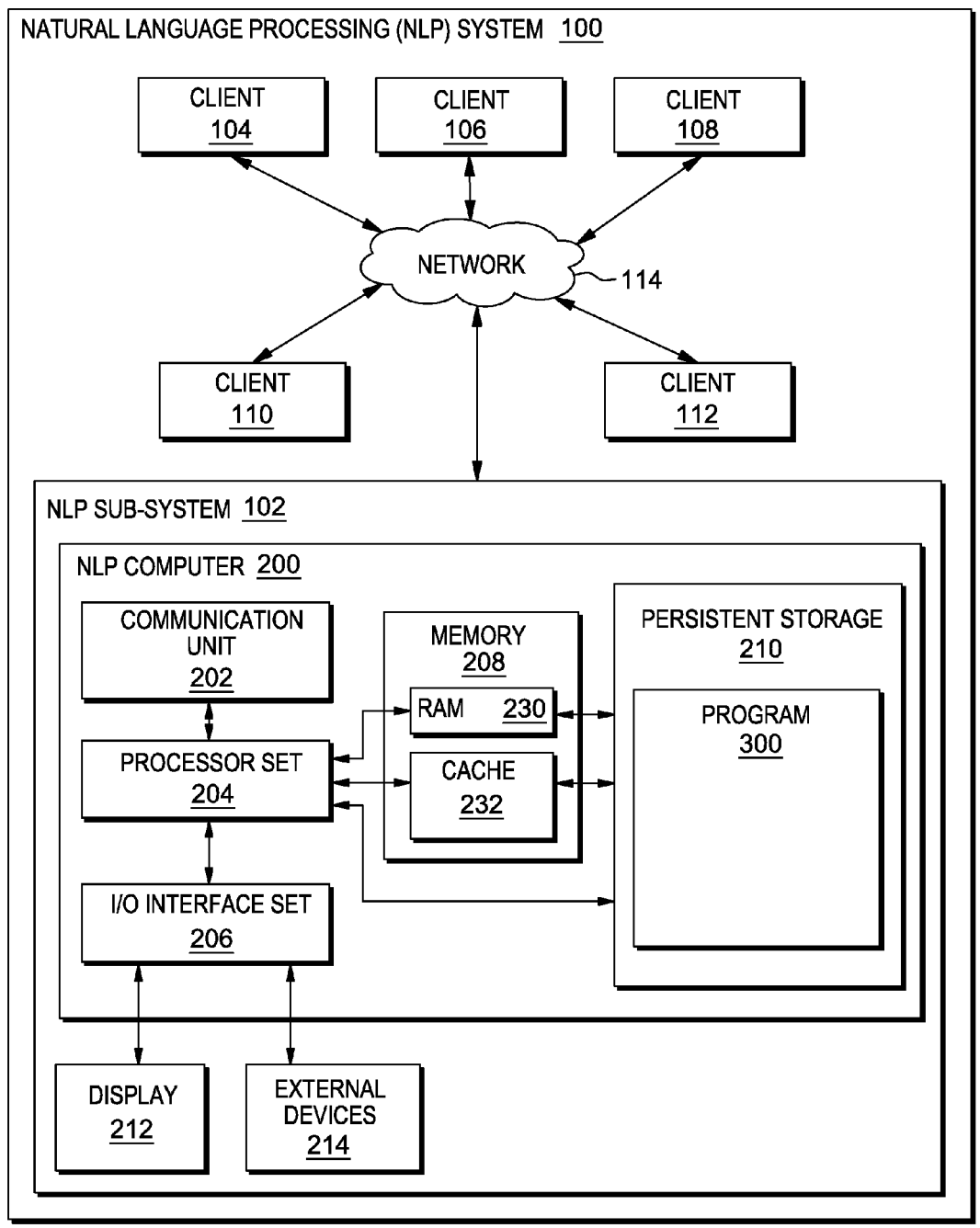
FIG. 1 is a block diagram view of a first embodiment of a system according to the present invention.

Many existing natural language processing (NLP) systems require ongoing maintenance and development work to correct false positive and false negative annotation errors. Embodiments according to the present invention use machine learning to automatically detect annotation errors and correspondingly update NLP annotators to prevent future erroneous annotations. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of natural language processing (NLP) system 100, including: NLP sub-system 102; client sub-systems 104, 106, 108, 110, 112; communication network 114; NLP computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with NLP computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
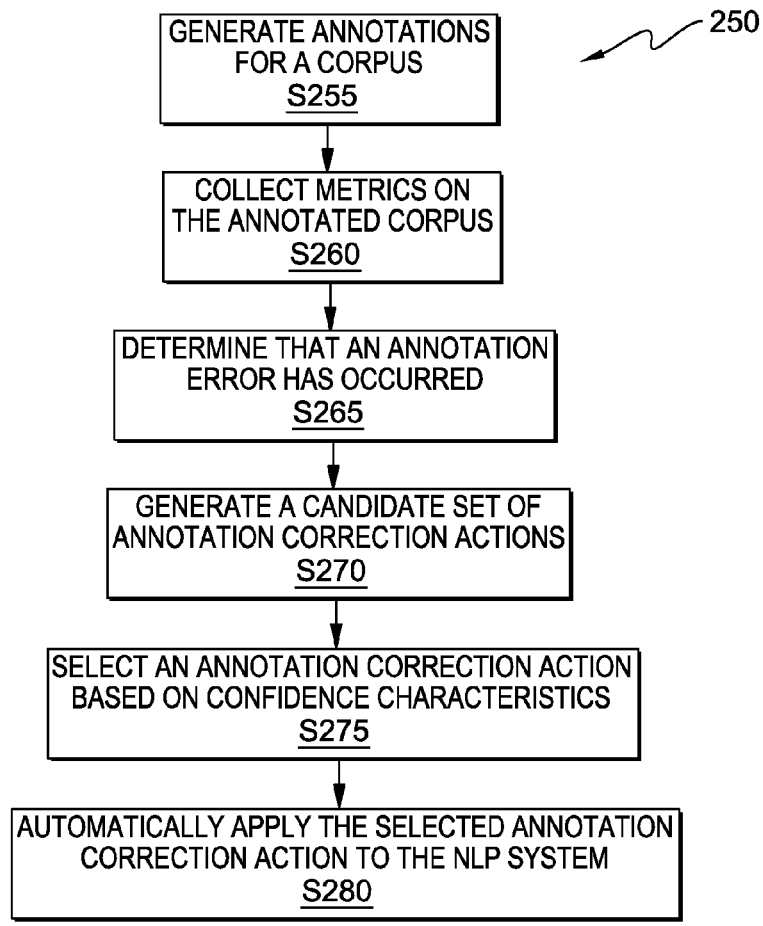
FIG. 2 is a flowchart showing a first embodiment method performed, at least in part, by the first embodiment system.
Figure 3:
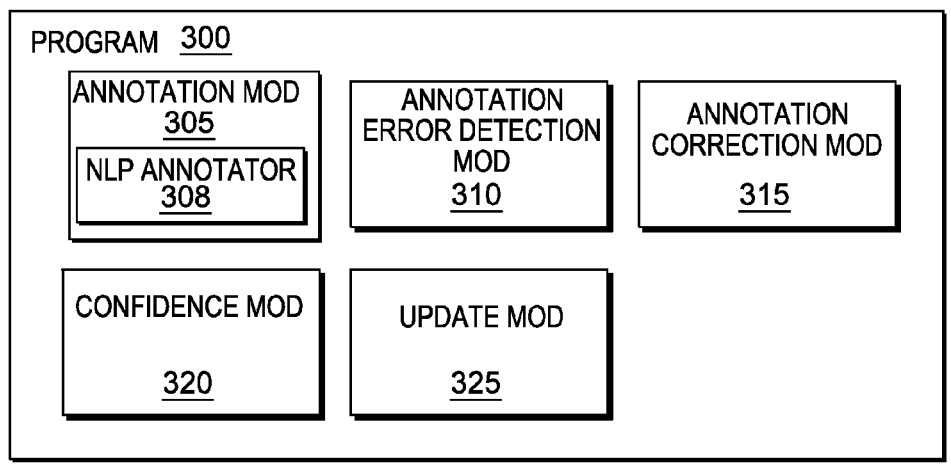
FIG. 3 is a block diagram showing a machine logic (for example, software) portion of the first embodiment system.

FIG. 2 shows flowchart 250 depicting a method (sometimes referred to as method 250) according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). In this example embodiment (referred to in this sub-section as the "present example," the "present example embodiment," the "present embodiment," and the like), NLP system 100 is adapted to annotate text documents (or "corpora") using NLP annotator 308 (for definitions of "annotate" and "NLP annotator," see the Definitions sub-section of this Detailed Description).

Processing begins at step S255, where annotation module ("mod") 305 operates natural language processing (NLP) annotator 308 to generate annotations for a corpus. In the present example, NLP annotator 308 is adapted to identify proper nouns in the corpus and annotate them with a label of "PROPER NOUN." Although the identification and annotation of proper nouns by NLP annotator 308 is governed by a complex set of machine logic-based algorithms, NLP annotator 308 generally places a substantial amount of weight on words that are capitalized and in the middle of sentences. As such, upon performing step S255, annotation mod 305 labels the following sets of words as proper nouns: (i) "Statute of Liberty;" (ii) "Thomas J. Watson:" and (iii) "Light Amplification by Stimulated Emission of Radiation."

It should be noted that a wide variety of known (and yet to be known) annotation schemes may be used in annotating according to the present invention. Although the present embodiment includes an example meant to demonstrate the features of the present invention, other embodiments may annotate in many other (and often, more complex) ways. For example, in some embodiments, hyperlinks are added to text in the corpus in order to link them to relevant webpages. In other (or the same) embodiments, HTML metadata—such as HTML tags and descriptors—are added to the corpus to better enable the corpus text to be viewed in a web browser. In still other embodiments, part-of-speech tags are added to the text to better identify parts of speech as part of a broader natural language processing scheme.

Processing proceeds to step S260, where annotation mod 305 collects metrics on the annotated corpus. Generally speaking, the collected metrics are meant to help identify potential annotation errors made by NLP annotator 308. In some embodiments (such as those discussed below in the Further Comments and/or Embodiments sub-section of this Detailed Description), annotation mod 305 collects the metrics by operating NLP annotator 308 a second time using annotation settings adapted to detect annotation errors. In other embodiments, annotation mod 305 collects the metrics without having to re-operate NLP annotator 308.

In the present example embodiment, one metric that annotation mod 305 collects is a list of non-annotated words (that is, words that were not identified as proper nouns in step S255) that begin sentences. The reason for collecting this metric is that words that begin sentences are typically capitalized, thereby making it more difficult to properly identify a proper noun at the beginning of a sentence. Another metric that annotation mod 305 collects in the present embodiment is a list of annotated sets of words (that is, sets of words that were identified in step S255 as forming proper nouns) where the first letters of each capitalized word in a set can be combined to form another known word. The reason for collecting this metric is due to the somewhat common practice of capitalizing letters that form an acronym, where doing so makes it more difficult for NLP annotator 308 to determine whether the capitalized words form a proper noun. While this metric and the preceding metric are used in the present embodiment for example purposes, it should be noted that many other possible metrics are collected by embodiments according to the present invention. For additional examples of metrics, see the Further Comments and/or Embodiments sub-section of this Detailed Description.

Processing proceeds to step S265, where annotation error detection mod 310 determines that annotation error(s) have occurred in the annotation of the corpus based, at least in part, on the collected metrics. In the present embodiment, mod 310 detects two errors. First, using the list of words that begin sentences, along with their corresponding contexts within the corpus, mod 310 determines that the word "Rose" refers to the name of a person, and not an actual rose. As such, "Rose," which began a sentence in the corpus, was incorrectly not annotated with a "PROPER NOUN" label, resulting in a "false negative" error. Second, using the list of potential acronyms, and using the corresponding contexts of those potential acronyms, mod 310 determines that "Light Amplification by Stimulated Emission of Radiation" simply forms the acronym "LASER," and was incorrectly annotated with a "PROPER NOUN" label, thereby resulting in a "false positive" error.

A wide variety of possible methods may be used to determine annotation errors according to the present invention. For example, in many embodiments, words detected by mod 310 are provided with scores indicating a level of probability that an annotation error has occurred. In these embodiments, only the words with scores over a certain threshold may ultimately be determined to have been the result of an error. In other embodiments, any and all potential errors that have been identified via the collected metrics are treated as a determined errors, even if the likelihood of an actual error is low. In still other embodiments, actual errors are determined manually by a human auditor. However, these examples are not meant to be limiting, and embodiments according to the present invention may determine annotation errors in any of a wide variety of ways. For additional discussion of ways to determine annotation errors (also referred to as "identifying missed concepts" and "identifying overmatched concepts"), see the Further Comments and/or Embodiments sub-section of this Detailed Description.

Processing proceeds to step S270, where annotation correction mod 315 generates candidate set(s) of annotation correction actions. In many embodiments, each annotation correction action is adapted to prevent an occurrence of an error similar to a determined annotation error. Or, stated another way, once it is determined that an annotation error has occurred, annotation correction mod 315 generates annotation correction actions that, if implemented, would prevent NLP system 100 from making the same error (or similar errors) in the future. Annotation correction actions may be determined in a wide variety of ways. For example, in many embodiments, mod 315 determines an underlying cause for each annotation error and generates correction action(s) based on those causes. Some examples of underlying causes and their corresponding correction actions can be found below in the Further Comments and/or Embodiments sub-section of this Detailed Description. In the present example embodiment, two candidate sets of annotation correction errors are generated: one for the false negative of the word "Rose," and one for the false positive of the words "Light Amplification by Stimulated Emission of Radiation."

Referring to the false negative of the word, "Rose," annotation correction mod 315 generates the following candidate set of annotation correction actions: (i) adding "Rose" to an inclusion list, such that "Rose" is always annotated with the "PROPER NOUN" label; and (ii) creating a rule that annotates potential proper nouns (that is, words that sometimes are proper nouns and sometimes are not) with the "PROPER NOUN" label if they aren't preceded by a definite article.

Referring to the false positive of the word, "Light Amplification by Stimulated Emission of Radiation," annotation correction mod 315 generates the following candidate set of annotation correction actions: (i) adding "Light Amplification by Stimulated Emission of Radiation" to an exception list, such that "Light Amplification by Stimulated Emission of Radiation" is never annotated with the "PROPER NOUN" label; and (ii) creating a rule that prevents acronym-forming sets of words from being annotated with the "PROPER NOUN" label.

Processing proceeds to step S275, where confidence mod 320 selects an annotation correction action based, at least in part, on a set of confidence characteristics. Embodiments according to the present invention provide a wide variety of possible confidence characteristics for selecting an appropriate annotation correction action. In some embodiments (such as those discussed in the Further Comments and/or Embodiments sub-section of this Detailed Description), the following confidence characteristics are used: (i) the degree of harmony/discord of a data point (for example, its consistency with a semantic role); and/or (ii) the frequency of data points supporting the annotation correction action. However, this is not meant to be limiting, and other examples of potential confidence characteristics include, but are not limited to, the following: (i) characteristics that prioritize minimizing the amount of potential change to NLP system 100 (such as, for example, adding word(s) to an exception list); (ii) characteristics that prioritize maximizing the amount of potential change to NLP system 100 (such as, for example, adding rules that apply more broadly than just to a specific word or set of words); (iii) characteristics that prioritize similarity to existing annotation rules; (iv) characteristics that prioritize annotation correction actions that correct multiple determined annotation errors; and/or (v) characteristics that prioritize annotation correction actions based on how difficult it would be to implement the actions in NLP system 100.

In the present example embodiment, there following confidence characteristics are used: (i) annotation correction actions that simply exclude/include a specific word (or set of words) are given a high level of confidence, unless the specific word (or set of words) is determined to likely be a word that is sometimes a proper noun and sometimes not a proper noun, depending on context; and (ii) annotation correction actions that apply more broadly (that is, to more than a specific word or set of words) are given a lower level of confidence. As such, in the present example, confidence mod 320 selects the following annotation correction actions: (i) for the false negative of the word, "Rose," the rule that annotates potential proper nouns with the "PROPER NOUN" label only if they aren't preceded by a definite article; and (ii) for the false positive of the word, "Light Amplification by Stimulated Emission of Radiation," the adding of "Light Amplification by Stimulated Emission of Radiation" to the exception list.

Processing proceeds to step S280, where update mod 325 automatically applies the selected error correction action(s) to NLP system 100. This can be done in a wide variety of ways. For example, in some embodiments, error correction actions are provided to NLP annotator 308 as part of a software update. In other embodiments, error correction actions are simply received as input to an annotation rule configuration module of NLP annotator 308. In still other embodiments, error correction actions are provided to NLP system 100 via network 114, in order to update additional NLP annotators used by client sub-systems 104, 106, 108, 110, 112.

In the present example embodiment, in step S280, update mod 325 automatically updates NLP annotator 308 so that potential proper nouns are annotated with the "PROPER NOUN" label only if they aren't preceded by a definite article. Furthermore, update mod 325 updates NLP annotator 308 so that it automatically excludes "Light Amplification by Stimulated Emission of Radiation," from being annotated with the "PROPER NOUN" label.

Upon completion of step S280, processing for method 250 completes. In many embodiments, NLP annotator 308 continues operating on subsequent corpora, exhibiting fewer errors than in previous iterations and, in many cases, repeating the steps of flowchart 250 to detect additional errors.

III. Further Comments and/or Embodiments

Some embodiments of the present invention recognize the following facts, potential problems and/or potential areas for improvement with respect to the current state of the art: (i) natural language processing (NLP) components typically require ongoing maintenance/evaluation as variations in text are processed and new false negative/positives surface; (ii) it is difficult for NLP developers to move to subsequent projects because of ongoing maintenance requirements; (iii) from a customer perspective, the turnaround time on receiving fixes for issues reported on mature NLP components can be lengthy; (iv) issues resulting from simple oversights on behalf of an NLP developer can take a long time to fix; (v) adapting an NLP model to a different domain (or, for example, in the context of health care providers, a different health care provider) can be a time-consuming process; and/or (vi) subtle variations in document structure, vernacular, section headers, or lack thereof can disrupt the accuracy of an NLP model.

Some embodiments according to the present invention automate identification and/or evaluation of false negatives (and/or false positives) in a live NLP system and address the problem in real-time, automatically (see the Definitions sub-section of this Detailed Description).

Some embodiments according to the present invention automate real-time monitoring and/or evaluation of false negatives (and/or false positives) for a given natural language processing (NLP) component. The following factors are typically considered: (i) content within the NLP component (for example, dictionary terms); (ii) external data (such as a corpus) serving as a guidepost for the probability of a term/phrase's semantic role; and/or (iii) harmony/discord of candidate false negatives (or positives) within a document being processed.

Some embodiments according to the present invention automate real-time updating of natural language processing (NLP) components to address a false negative (or positive) within a document and/or subsequent documents. Some embodiments: (i) add new dictionary terms when false positives result from missing concept terms; (ii) identify context rules needed to filter-out false positives and include false negatives; (iii) generate new candidate context rules and measure them against a ground truth to compute the best option; and/or (iv) create specific meta-rules when a top scoring rule adversely impacts accuracy against a ground truth (where, for example, a falsity scores high in confidence). Additionally, in some embodiments, false positives are addressed ad hoc, without adding new context rules, when new context rules could trigger false positives. In some of these embodiments, rules (or filters) for addressing false-positives would be very specific, designating, for example, a specific phrase (or even a specific document) in scenarios where a rule would adversely impact accuracy scores if applied to all documents/phrases. Generally speaking, these ad hoc rules/filters would address edge-case errors that might otherwise be left alone (using, for example, an 80/20 rule).

Regarding ground truths, some embodiments of the present invention measure the accuracy of NLP components by comparing annotations performed by the NLP components with ground truth annotations performed by humans. In most cases, the ground truth annotations performed by humans serve as a virtual "answer key" for what the NLP component should annotate if it were 100% accurate. In many of these embodiments, the comparison (which is sometimes referred to as an "impact analysis") includes calculating, for example: (i) recall; (ii) precision; and/or (iii) an f-score (which considers both recall and precision).

Figure 4:
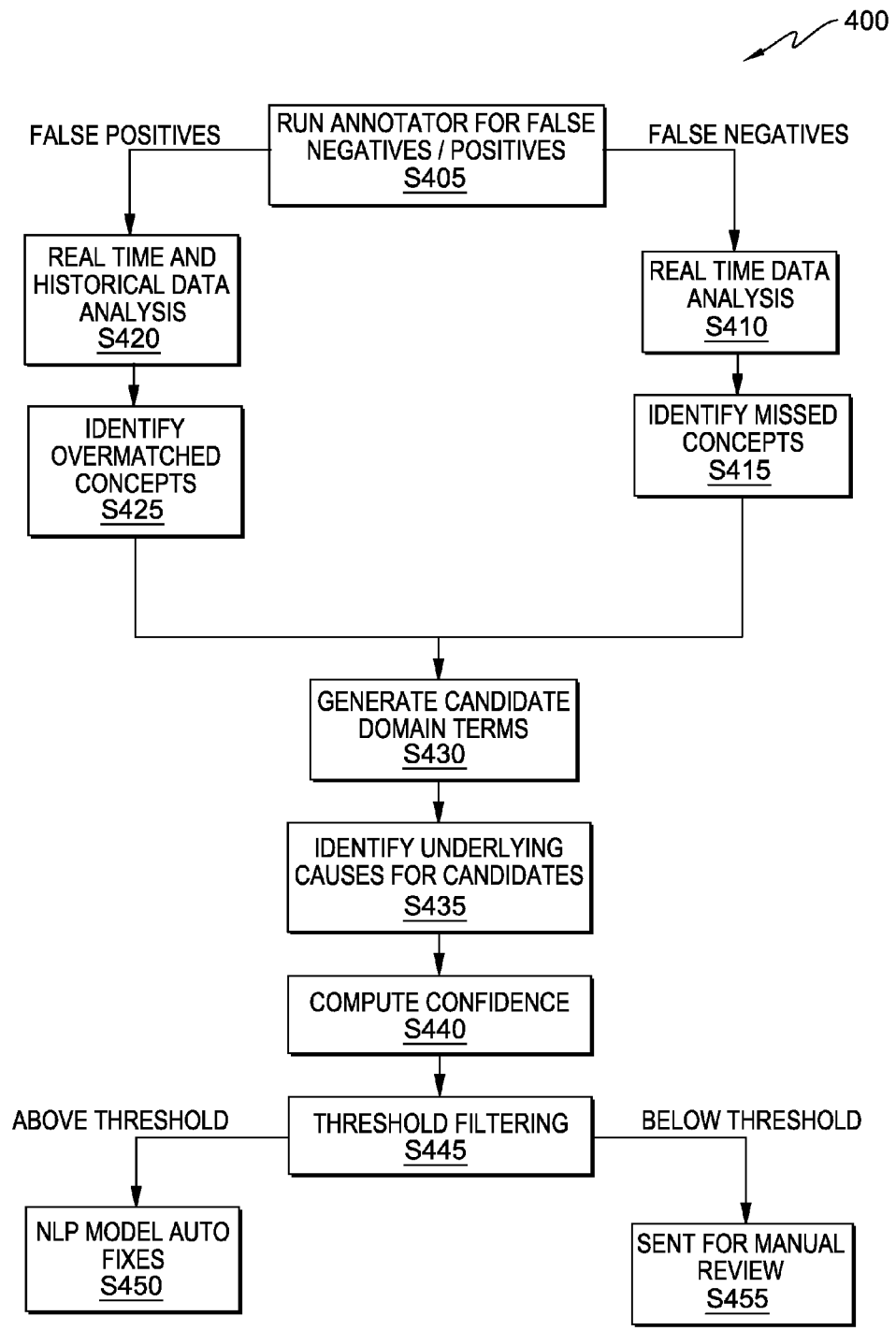
FIG. 4 is a flowchart showing a second embodiment method performed, at least in part, by a second embodiment system.

FIG. 4 shows flowchart 400 depicting a method (sometimes identified as method 400) according to the present invention. Generally speaking, method 400 is adapted to identify false positives and false negatives in the annotation performed by an NLP system. Processing begins with step S405, where method 400 runs an annotator and collects metrics to use in determining false negatives and false positives. It should be noted that this annotator is different from the NLP system's initial concept annotator (or "initial annotator")—while the initial concept annotator annotates items according to the NLP system's domain, the current annotator determines items that were incorrectly annotated (or incorrectly not annotated) by the initial annotator. Alternatively, in other embodiments, the annotator of step S405 is the same annotator as the initial concept annotator, but configured to operate in an error detection mode instead of typical annotation mode.

In determining false negatives (that is, words/phrases that were not previously annotated by the NLP system, but should have been), a wide variety of data (or metrics) may be collected. In some embodiments, unidentified items within tight clusters of a given concept are collected. For example, if an unidentified item is included in a comma-separated list, and the comma-separated list includes other items that have been identified and/or annotated, it follows that the unidentified item may be of the same class as the other items in the comma-separated list (and therefore should be given the same identification/annotation). More specifically, in one example, the following comma-separated list is provided, where <SYMPTOM> represents an item that has been annotated as a symptom: "<SYMPTOM>, <SYMPTOM>, night sweats, <SYMPTOM>". Given the fact that "night sweats" is in a list of symptoms, it is possible that "night sweats" is a false negative for the annotation of "<SYMPTOM>."

Additional examples of data that may be used to identify false negatives include, but are not limited to, the following: (i) terms that align with detected concepts within an ontology (for example, domain-specific semantic types or other relationships); and/or (ii) terms with consistent semantic roles and contextual triggers (for example, the phrase "patient reported experiencing" is likely to be followed by a symptom).

As with false negatives, a wide variety of data (or metrics) may be collected to determine false positives (that is, words/phrases that were incorrectly annotated by the NLP system). Examples of data that may be used to determine false positives (also referred to as "overmatched concepts")

include, but are not limited to, the following: (i) terms/concepts detected outside of a clustering of concepts (for example, concepts that are not in a comma-separated list); (ii) terms/concepts detected within a section where the concept would not typically be found; and (iii) terms inconsistent with previously determined semantic roles.

When false negatives are detected in step S405, processing proceeds to step S410, where the NLP system performs real-time data analysis. More specifically, in this step, the NLP system compares the detected false negatives to data pertaining to true positives and true negatives. For example, if a detected false negative was detected due to being included in a tight clustering of concepts, the false negative would be compared to known true positives and true negatives that appeared in similar clusters. Many known (or yet to be known) methods for comparing data may be used in this step. Upon completion of the real-time data analysis, processing proceeds to step S415, where the "missed" concepts (that is, the previously unidentified false negatives) are identified. In this step, the false negatives that contextually align with known true positives are identified as "missed" concepts, and the false negatives that contextually align with known true negatives are disregarded.

When false positives are detected in step S405, processing proceeds to step S420, where the NLP system performs real-time and historical data analysis. More specifically, in this step the NLP system compares the detected false positives to data pertaining to true positives and true negatives. For example, if a detected false positive was detected based on its semantic role, the false positive would be compared to known true positives and true negatives that have similar semantic roles. Many known (or yet to be known) method for comparing data may be used in this step. Upon completion of this analysis, processing proceeds to step S425, where the "overmatched" concepts (that is, the previously identified false positives) are identified. In this step, the false positives that contextually align with known true negatives are identified as "overmatched" concepts, and the false positives that align with known true positives are disregarded.

Upon completion of steps S415 (for false negatives) and/or S425 (for false positives), processing proceeds to step S430, where the NLP system generates candidate domain terms from the identified false negatives and false positives. Or, stated another way, in this step, the NLP system generates a "master list" of aggregated candidate terms (false positive terms and false negative terms) to be addressed in subsequent steps.

Processing proceeds to step S435, where the NLP system identifies underlying causes for the candidate terms. Or, stated another way, in this step, the NLP system identifies potential reasons for why each candidate term was improperly included/excluded by the initial annotator. Examples of underlying causes include, but are not limited to, the following: (i) missing terms/inflections in the domain's dictionary; (ii) missing contextual triggers for concept detection; and/or (iii) issues within underlying context rules that triggered a particular false positive or precluded a particular false negative. Once a cause has been identified, a corresponding fix (also referred to as an "annotation correction action") is proposed. For example, regarding (iii), above, when issues within particular context rules are identified as underlying causes, the NLP system may then determine modification(s) (or fixes) to the context rules to accommodate/preclude concept detection. Alternatively, the NLP system may determine that a specific, one-off, context rule (or fix) is necessary to properly handle a given concept.

Underlying causes may be determined in a wide variety of ways. For example, one way to determine whether an improper annotation (misannotation) is based on an imperfect dictionary is to look at other instances of the same word/phrase. If the same word/phrase is annotated improperly every time, then the cause is likely to be related to a dictionary problem. Another way to determine underlying causes is to employ adapters that recognize traits of a given technology. For example, in some embodiments, adapters will annotate terms with industry specific terms/traits that are not present in a dictionary. In these embodiments, when an annotation includes one of those industry specific terms or traits, it can be inferred that the underlying cause was not dictionary related.

Processing proceeds to step S440, where the NLP system computes the confidence of the candidate false positives/negatives and their correspondingly proposed fixes. Many of a wide variety of methods for computing confidence (or confidence scores) may be used. For example, in some embodiments, the degree of harmony and/or discord of a data point (for example, its consistency with a semantic role) is used to compute confidence. In other embodiments (or the same embodiments), the confidence is computed based, at least in part, on the frequency of data points supporting a candidate false positive/negative (for example, whether it appears frequently in highly concentrated concept clusters).

Processing proceeds to step S445, where the NLP system performs threshold filtering for the generated candidate terms and their correspondingly proposed fixes. In this step, the confidence values determined in the previous step are used to separate the fixes into two categories: (i) fixes that are more likely to fix a miss or an overmatch by the initial concept annotator; and (ii) fixes that are less likely to fix a miss or an overmatch by the initial concept annotator.

For fixes that are above the threshold (that is, fixes that are more likely to fix a miss/overmatch), processing proceeds to step S450, where the NLP system automatically updates its NLP model accordingly. For fixes that are below the threshold (that is, fixes that are less likely to fix a miss/overmatch), processing proceeds to step S455, where additional details are provided for manual review. In many embodiments, the manual review is performed by a human reviewer, while in others, the manual review is performed automatically and/or without substantial human intervention (see the Definitions sub-section of this Detailed Description). In some embodiments, once a fix is approved during this step, subsequent, related issues are given higher confidence values moving forward.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Annotate: to add information to text, including, but not limited to: (i) adding additional textual content, such as by linking, tagging (and part-of-speech tagging), adding metadata, providing markup, indicating lemma (or base forms of a word), labeling, commenting, or explaining; and/or (ii) modifying the text, such as by highlighting, underlining, bolding, italicizing, or parsing.

Natural Language Processing (NLP) Annotator: any module that annotates text using natural language processing.

What is claimed is:

1. A method comprising:
   causing, by one or more processors, a first natural language processing (NLP) annotator of an NLP system to annotate a corpus, thereby producing an annotated corpus that includes a first set of annotation(s);
   causing, by one or more processors, a second NLP annotator of the NLP system to annotate the annotated corpus that includes the first set of annotation(s), thereby producing a second set of annotation(s) that annotate the annotated corpus that includes the first set of annotation(s);
   determining, by one or more processors, based, at least in part, on the second set of annotation(s), that a first annotation error has occurred in the annotation of the corpus by the first NLP annotator;
   identifying, by one or more processors, a cause of the first annotation error;
   generating, by one or more processors, a candidate set of annotation correction actions, where each annotation correction action of the set is directed to the identified cause and is adapted to prevent an occurrence of an error similar to the first annotation error by the first NLP annotator;
   selecting, by one or more processors, an annotation correction action from the candidate set of annotation correction actions, based, at least in part, on a set of annotation correction confidence characteristics and based, at least in part, on an impact analysis performed against one or more ground truth annotations, the ground truth annotations having been performed by humans;
   automatically applying, by one or more processors, the selected annotation correction action to the first NLP annotator; and
   causing, by one or more processors, the first NLP annotator to annotate a new corpus, thereby producing new annotation(s) based on the applied annotation correction action.

2. The method of claim 1, wherein determining that the first annotation error has occurred is based, at least in part, on metrics collected during the annotation of the corpus by the first NLP annotator.

3. The method of claim 1, wherein the identified cause of the first annotation error is a missing item.

4. The method of claim 3, wherein the missing item is a contextual trigger.

5. The method of claim 1, wherein the annotation correction confidence characteristics include a degree of harmony/discord of a data point.

6. The method of claim 1, wherein the selected annotation correction action includes adding a set of word(s) to an inclusion list, or adding a set of word(s) to an exception list.

7. The method of claim 1, where in the selected annotation correction action includes updating a natural language processing rule.

8. A computer program product comprising a computer readable storage medium having stored thereon:
   program instructions programmed to cause a first natural language processing (NLP) annotator of an NLP system to annotate a corpus, thereby producing an annotated corpus that includes a first set of annotation(s);
   program instructions programmed to cause a second NLP annotator of the NLP system to annotate the annotated corpus that includes the first set of annotation(s), thereby producing a second set of annotation(s) that annotate the annotated corpus that includes the first set of annotation(s);
   program instructions programmed to determine, based, at least in part, on the second set of annotation(s), that a first annotation error has occurred in the annotation of the corpus by the first NLP annotator;
   program instructions programmed to identify a cause of the first annotation error;
   program instructions programmed to generate a candidate set of annotation correction actions, where each annotation correction action of the set is directed to the identified cause and is adapted to prevent an occurrence of an error similar to the first annotation error by the first NLP annotator;
   program instructions programmed to select an annotation correction action from the candidate set of annotation correction actions, based, at least in part, on a set of annotation correction confidence characteristics and based, at least in part, on an impact analysis performed against one or more ground truth annotations, the ground truth annotations having been performed by humans; and
   program instructions programmed to automatically apply the selected annotation correction action to the first NLP annotator; and
   program instructions programmed to cause the first NLP annotator to annotate a new corpus, thereby producing new annotation(s) based on the applied annotation correction action.

9. The computer program product of claim 8, wherein determining that the first annotation error has occurred is based, at least in part, on metrics collected during the annotation of the corpus by the first NLP annotator.

10. The computer program product of claim 8, wherein the identified cause of the first annotation error is a missing item in a dictionary.

11. The computer program product of claim 8, where in the selected annotation correction action includes updating a natural language processing rule.

12. A computer system comprising:
a processor(s) set; and
a computer readable storage medium;
wherein:
the processor set is structured, located, connected and/or programmed to run program instructions stored on the computer readable storage medium; and
the program instructions include:
  program instructions programmed to cause a first natural language processing (NLP) annotator of an NLP system to annotate a corpus, thereby producing an annotated corpus that includes a first set of annotation(s);
  program instructions programmed to cause a second NLP annotator of the NLP system to annotate the annotated corpus that includes the first set of annotation(s), thereby producing a second set of annotation(s) that annotate the annotated corpus that includes the first set of annotation(s);
  program instructions programmed to determine, based, at least in part, on the second set of annotation(s), that a first annotation error has occurred in the annotation of the corpus by the first NLP annotator;
  program instructions programmed to identify a cause of the first annotation error;
  program instructions programmed to generate a candidate set of annotation correction actions, where each annotation correction action of the set is directed to the identified cause and is adapted to prevent an occurrence of an error similar to the first annotation error by the first NLP annotator;
  program instructions programmed to select an annotation correction action from the candidate set of annotation correction actions, based, at least in part, on a set of annotation correction confidence characteristics and based, at least in part, on an impact analysis performed against one or more ground truth annotations, the ground truth annotations having been performed by humans; and
  program instructions programmed to automatically apply the selected annotation correction action to the first NLP annotator; and
  program instructions programmed to cause the first NLP annotator to annotate a new corpus, thereby producing new annotation(s) based on the applied annotation correction action.

13. The computer system of claim 12, wherein determining that the first annotation error has occurred is based, at least in part, on metrics collected during the annotation of the corpus by the first NLP annotator.

14. The computer system of claim 12, wherein:
the identified cause of the first annotation error is a missing item in a dictionary.

15. The computer system of claim 12, wherein the selected annotation correction action includes updating a natural language processing rule.

* * * * *